(12) United States Patent
Vontivilu et al.

(10) Patent No.: US 11,603,880 B2
(45) Date of Patent: Mar. 14, 2023

(54) TURBOCHARGER SHAFT WITH CLADDING

(71) Applicant: Cummins Inc., Columbus, IN (US)

(72) Inventors: Hareash Nandalal Vontivilu, Collierville, TN (US); Erica M. Raisor, Nashville, IN (US); Nikhil Doiphode, Columbus, IN (US); Todd M. Wieland, Columbus, IN (US); Abhijit Namjoshi, Columbus, IN (US); Howard S. Savage, Columbus, IN (US)

(73) Assignee: Cummins Inc., Columbus, IN (US)

( * ) Notice: Subject to any disclaimer, the term of this patent is extended or adjusted under 35 U.S.C. 154(b) by 935 days.

(21) Appl. No.: 16/405,245

(22) Filed: May 7, 2019

(65) Prior Publication Data

US 2019/0345972 A1 Nov. 14, 2019

Related U.S. Application Data

(60) Provisional application No. 62/668,468, filed on May 8, 2018.

(51) Int. Cl.
| | | |
|---|---|---|
| *F16C 3/02* | (2006.01) | |
| *B32B 15/01* | (2006.01) | |
| *B32B 1/00* | (2006.01) | |
| *F02C 6/12* | (2006.01) | |
| *B23K 26/34* | (2014.01) | |

(52) U.S. Cl.
CPC ............... *F16C 3/02* (2013.01); *B23K 26/34* (2013.01); *B32B 1/00* (2013.01); *B32B 15/011* (2013.01); *F02C 6/12* (2013.01); *F05D 2220/40* (2013.01); *F05D 2230/90* (2013.01); *F05D 2240/60* (2013.01); *F05D 2300/171* (2013.01)

(58) Field of Classification Search
CPC .... F16C 3/02; F16C 2202/04; F16C 2220/24; F16C 2360/24; B23K 26/34; B32B 1/00; B32B 15/011; F02C 6/12; F05D 2220/40; F05D 2230/90; F05D 2240/60; F05D 2300/171; F05D 2300/506; F01D 5/025
USPC ........................................................ 464/179
See application file for complete search history.

(56) References Cited

U.S. PATENT DOCUMENTS

| | | | | |
|---|---|---|---|---|
| 3,666,302 | A * | 5/1972 | Kellett ................... | F04D 29/20 |
| | | | | 403/361 |
| 5,129,784 | A * | 7/1992 | Yoshikawa .......... | B23K 20/129 |
| | | | | 403/30 |
| 6,848,180 | B2 * | 2/2005 | Shimizu .................. | F02B 39/00 |
| | | | | 416/213 R |
| 2005/0036893 | A1 * | 2/2005 | Decker ..................... | F01D 5/02 |
| | | | | 416/244 R |
| 2006/0021221 | A1 * | 2/2006 | Decker ................. | F04D 29/266 |
| | | | | 29/889.6 |
| 2006/0127243 | A1 * | 6/2006 | Vaccarezza ............. | F01D 5/025 |
| | | | | 417/407 |
| 2015/0198043 | A1 * | 7/2015 | Striedelmeyer ......... | F01D 5/025 |
| | | | | 219/616 |
| 2015/0224598 | A1 * | 8/2015 | Giorni .................... | B23P 23/04 |
| | | | | 29/888.011 |

(Continued)

*Primary Examiner* — J. Todd Newton
(74) *Attorney, Agent, or Firm* — Taft, Stettinius & Hollister LLP

(57) ABSTRACT

A turbocharger shaft includes a connection portion at a connection with a wheel of the turbocharger. The shaft includes a stainless steel cladding at least along one or more grooves of the connection portion to reduce the risk of cold cracking and bending fatigue.

19 Claims, 1 Drawing Sheet

(56) References Cited

U.S. PATENT DOCUMENTS

2016/0074963 A1\* 3/2016 Zollinger ............ B23K 26/067
219/121.62

\* cited by examiner

TURBOCHARGER SHAFT WITH CLADDING

CROSS-REFERENCE TO RELATED APPLICATION

The present application claims the benefit of the filing date of U.S. Provisional Application No. 62/668,468 filed on May 8, 2018, which is incorporated herein by reference in its entirety.

FIELD OF THE INVENTION

The present disclosure is directed to turbochargers, and more particularly to a turbocharger shaft that includes cladding along at least a portion of the shaft.

BACKGROUND

Turbochargers are high speed machinery that operate at high temperature, exhaust gas environments and therefore the turbocharger components are subject to extremely high strain and susceptible to wear. Replacement of turbocharger components can lead to long down-times and high costs.

For example, turbocharger shafts are connected to one or more wheels of the turbocharger to transfer rotational forces. In certain arrangements, the shaft includes one or more grooves in the connection region to the wheel. The shaft is subject to harsh environmental conditions and operating demands that can impact structural integrity dues to the high speeds and temperatures associated with turbocharger operation. For example, the shaft can be subject to cold cracking and bending fatigue, particularly in the connection area with the wheel. Therefore, further improvements in turbochargers are needed.

SUMMARY

A turbocharger shaft includes a shaft portion and at least one connection portion adjacent to a connection with a wheel of a turbocharger. The connection portion includes one or more grooves. The shaft includes a cladding at least along the one or more grooves to reduce the risk of cold cracking and bending fatigue. In certain embodiments, the cladding is stainless steel. In certain other embodiments, the cladding is a laser applied cladding. The cladding can be transformed by machining or other suitable technique into a desired final configuration.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
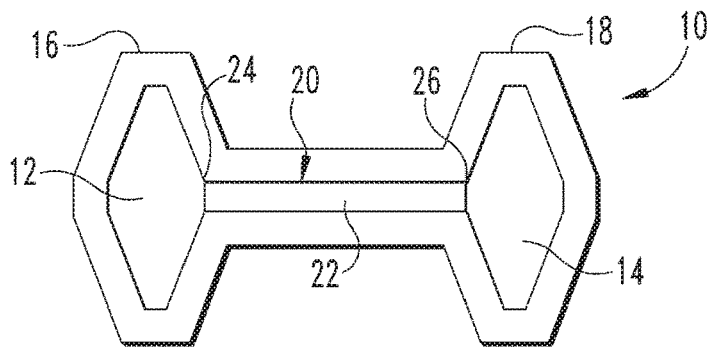
FIG. 1 is a schematic illustration of a turbocharger.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1 there is shown a schematic of a turbocharger 10 that includes a first wheel 12, such as a compressor wheel, and a second wheel 14, such as a turbine wheel. First and second wheels 12, 14 are housed in respective first and second housings 16, 18 and are connected to one another with an elongated shaft 20 that extend between wheels 12, 14.

Figure 2A:
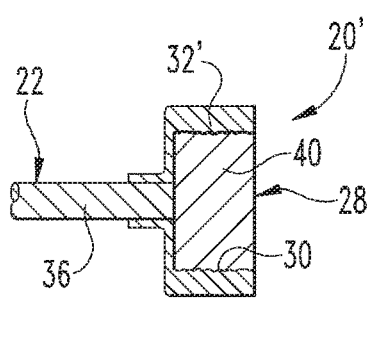
FIGS. 2A and 2B are schematic illustrations of a portion of a shaft of the turbocharger of FIG. 1.
Figure 2B:
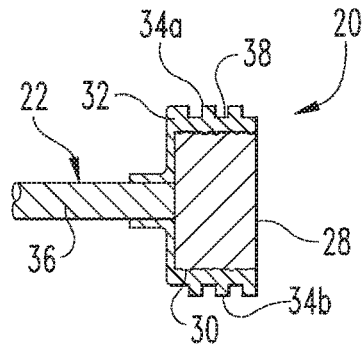

Shaft 20 includes an elongated shaft portion 22 that extends between a first end 24 and an opposite second end 26. As shown in FIGS. 2A and 2B, at least one of the first and second ends 24, 26 includes a connection portion 28 adjacent the connection with the respective wheel 12, 14. Although only one connection portion 28 is shown in FIGS. 2A-2B, it is contemplated that separate connection portions 28 can be provided at each of the first and second ends 24, 26. The connection portion(s) 28 include a base material 40 that has one or more grooves 30 extending circumferentially therearound.

In one embodiment, the shaft portion 22 includes a circular cross-section and is smaller in size than the connection portion(s) 28 extending from the end or ends thereof. The connection portion(s) 28 may also include a circular cross-section, although non-circular configurations are also contemplated. The connection portion(s) 28 may also be connected with the respective wheels 12, 14 during the cladding process.

The connection portion 28 includes a cladding 32 in the grooves 30, as shown in FIG. 2A. After the cladding 32 is fused to the underlying base material, the cladding 32 altered by machining or other suitable technique to include one or more protrusions 34a, 34b and one or more recesses 38. The protrusions 34a, 34b and recesses 38 are formed in the cladding material for any reason, such as for connection with one or more components of the turbocharger.

In one embodiment, the material for cladding 32 is stainless steel. In another embodiment, the material for classing 32 is low carbon stainless steel. The stainless steel cladding has been found to reduce the risk of cold cracking and bending fatigue.

In one specific embodiment, a turbocharger wheel shaft subject was laser cladded with low carbon 410 stainless steel powder. Four (4) material powders like 410L, 420SS, B27 and NCORR were tried for cladding. Use of low carbon provided controlled martensitic transformation with Heat Affected Zone (HAZ) hardness of close to 350 HV (Vickers) as per AWS D1.1 standard requirements, which suggest keeping hardness to lower than 350HV. Varying material, power feed rate, part rotation rate, row bead thickness, and layer spacing were conducted to bring down the hardness to less than 350 HV with minimal or no lack of fusion and cold cracking issues.

Figure 3:
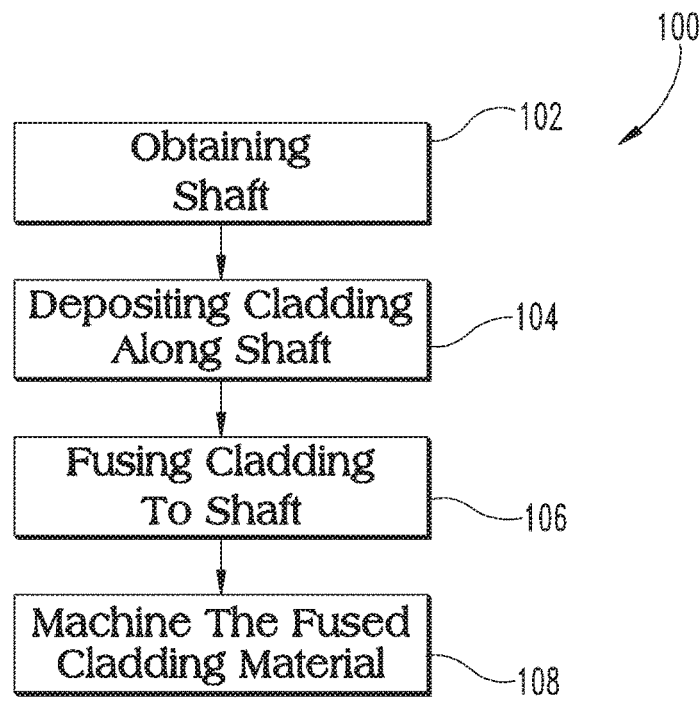
FIG. 3 is a flow diagram of a procedure for cladding a turbocharger shaft.

In one embodiment of the laser cladding process 100 such as shown in FIG. 3, a shaft 20 is obtained at step 102. The shaft 20 can be obtained from an existing turbocharger and subject to wear and deformation over time such the current dimensions of the obtained shaft are outside of a desired range or specification. Process 100 continues at step 104 in which cladding material is deposited along all or a portion of the shaft 20 at which restoration is desired. At step 106 the cladding is fused to the shaft 20 using a laser process. At step 108, the fused cladding material is machined to a desired configurations so the shaft 20 is restored to be within a desired dimensional range and/or specification.

In one embodiment, the cladding material is a filler material in the form of a fine alloy powder that is melted on the base material 40 along the grooves 30 and/or shaft portion 22 using a laser beam, and then fused to the base material 40 of the shaft 20. In one embodiment, the laser beam is delivered through a nozzle along with shield gas and powder material for the cladding. The powder material is melted by the laser on the substrate formed by the base material 40 to provide a cladding layer one the base material 40. A strong metallurgical bond is formed between the melted powder material and the base material 40 as the melted powder material solidifies to form the cladding 32.

The laser applied cladding 32 can be applied to damaged shaft components to restore the components and improve resistance to erosion and corrosion. In one embodiment, a radial thickness of about 2 mm is provided for the cladding 32, although other thicknesses are contemplated.

After the cladding material is deposited along the grooves 30, the cladding 32 can be machined to provide one or more protrusions 34a, 34b or other desired configuration for connection with a turbocharger component. One or more recesses 38 can be provided between adjacent protrusions 34a, 34b. The protrusions 34a, 34b and/or recess 38 can extend circumferentially, completely or partially, around the corresponding connection portion 28. Other embodiments contemplated other configurations being formed in the cladding 32 as may be desired.

In one embodiment, the connection portion(s) 28 and/or shaft portion 22 have been worn during operation of the turbocharger 10 such that one or more grooves 30 are no longer within original specification or tolerance limits. Cladding 32 is applied over the affected area or areas, and then machined or otherwise altered to restore the affected area or areas to original specification or tolerance limits.

Various aspect of the present disclosure are contemplated. According to one aspect, a turbocharger shaft includes an elongated shaft portion extending to a connection portion for connection with a wheel of the turbocharger. The connection portion includes one or more grooves and a cladding along the one or more grooves.

In one embodiment, the cladding is provided only along the connection portion of the shaft. In another embodiment, the cladding is also provided along the shaft portion of the shaft.

In another embodiment, the cladding is a stainless steel material. In a refinement of this embodiment, the cladding is a stainless steel powder. In another refinement, the cladding is a low carbon stainless steel. In another refinement, the cladding is a low carbon 410 stainless steel powder.

In another embodiment, the cladding includes a Heat Affected Zone hardness that is less than 350HV. In yet another embodiment, the connection portion is enlarged relative to the shaft portion, and the one or more grooves include a plurality of circumferential grooves that extend around the connection portion. In still another embodiment, the cladding extends along the connection portion and the shaft portion, and the cladding is machined to form one or more protrusions and one or more recesses adjacent the one or more protrusions.

According to another aspect, a turbocharger shaft includes an elongated shaft portion extending between opposite first and second ends. At least one of the first and second ends includes an enlarged connection portion adjacent a respective wheel of the turbocharger. The connection portion includes a cladding material fused to an underlying base material and one or more protrusions formed by the cladding material.

In one embodiment, the cladding material is fused to the underlying base material in circumferential grooves that extend around the enlarged connection portion.

According to another aspect, a method for manufacturing a turbocharger shaft includes: depositing a cladding material in one or more grooves of a connection portion adjacent at least one end of the shaft where the at least one end is configured for connection with a wheel of the turbocharger; and fusing the cladding material to a base material of the shaft along one or more grooves of the connection portion.

In one embodiment, the shaft includes a shaft portion and the grooved portion is enlarged relative to and projects outwardly from the at least one end of the shaft portion, and the cladding material is deposited along the both grooved portion and the shaft portion of the shaft.

In one embodiment, the cladding material is stainless steel. In one refinement, the cladding material is a low carbon stainless steel. In another refinement, the cladding material is a low carbon 410 stainless steel powder. In another embodiment, the cladding material includes a Heat Affected Zone hardness that is less than 350HV.

In yet another embodiment, the method includes melting the cladding material with a laser to fuse the cladding material to the base material where the base material forms a substrate along the cladding material. In a refinement of this embodiment, the method includes machining the fused cladding material to a desired configuration. In a further refinement, the desired configuration includes one or more protrusions formed by the fused cladding material and one or more recesses adjacent the one or more protrusions.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A turbocharger shaft, comprising:
    an elongated shaft portion extending to a connection portion for connection with a wheel of the turbocharger, the connection portion including one or more grooves between an underlying base material of the shaft and a cladding of the shaft along the one or more grooves, wherein the cladding is machined to form one or more protrusions and one or more recesses adjacent the one or more protrusions.

2. The turbocharger shaft of claim 1, wherein the cladding is provided only along the connection portion of the shaft.

3. The turbocharger shaft of claim 1, wherein the cladding is a stainless steel material.

4. The turbocharger shaft of claim 3, wherein the cladding is a stainless steel powder.

5. The turbocharger shaft of claim 3, wherein the cladding is a low carbon stainless steel.

6. The turbocharger shaft of claim 3, wherein the cladding is a low carbon 410 stainless steel powder.

7. The turbocharger shaft of claim 1, wherein the cladding includes a Heat Affected Zone hardness that is less than 350HV.

8. The turbocharger shaft of claim 1, wherein the connection portion is enlarged relative to the shaft portion, and the one or more grooves include a plurality of circumferential grooves that extend around the connection portion.

9. The turbocharger shaft of claim 1, wherein the cladding extends along the connection portion and the shaft portion.

10. A turbocharger shaft, comprising:
an elongated shaft portion extending between opposite first and second ends, at least one of the first and second ends including an enlarged connection portion for connection adjacent to a respective wheel of the turbocharger, the connection portion including a cladding material fused to an underlying base material of the shaft and one or more protrusions formed by machining the cladding material.

11. The turbocharger shaft of claim 10, wherein the cladding material is fused to the underlying base material of the shaft in circumferential grooves that extend around the enlarged connection portion.

12. A method for manufacturing a turbocharger shaft, comprising:
depositing a cladding material in one or more grooves of a connection portion adjacent at least one end of the shaft, wherein the at least one end is configured for connection with a wheel of the turbocharger;
fusing the cladding material to a base material of the shaft along the one or more grooves and
machining the fused cladding material to a desired configuration.

13. The method of claim 12, wherein the shaft includes a shaft portion and the grooved portion is enlarged relative to and projects outwardly from the at least one end of the shaft portion, and the cladding material is deposited along the both grooved portion and the shaft portion of the shaft.

14. The method of claim 12, wherein the cladding material is stainless steel.

15. The method of claim 14, wherein the cladding material is a low carbon stainless steel.

16. The method of claim 14, wherein the cladding material is a low carbon 410 stainless steel powder.

17. The method of claim 12, wherein the cladding material includes a Heat Affected Zone hardness that is less than 350HV.

18. The method of claim 12, further comprising melting the cladding material with a laser to fuse the cladding material to the base material, wherein the base material forms a substrate along the cladding material.

19. A method for manufacturing a turbocharger shaft, comprising:
depositing a cladding material in one or more grooves of a connection portion adjacent at least one end of the shaft, wherein the at least one end is configured for connection with a wheel of the turbocharger;
fusing the cladding material to a base material of the shaft along the one or more grooves;
melting the cladding material with a laser to fuse the cladding material to the base material, wherein the base material forms a substrate along the cladding material; and
machining the fused cladding material to a desired configuration,
wherein the desired configuration includes one or more protrusions formed by the fused cladding material and one or more recesses adjacent the one or more protrusions.

* * * * *